United States Patent [19]

Stegmüller et al.

[11] 4,402,232

[45] Sep. 6, 1983

[54] ENGAGEMENT PRESSURE MEASURING APPARATUS FOR ROLLERS IN PRINTING MACHINES

[75] Inventors: Albert Stegmüller, Friedberg; Herbert Stöckl, Augsburg; Johann Winterholler, Friedberg, all of Fed. Rep. of Germany

[73] Assignee: M.A.N.-Roland Druckmaschinen Aktiengesellschaft, Offenbach am Main, Fed. Rep. of Germany

[21] Appl. No.: 270,963

[22] Filed: Jun. 5, 1981

[30] Foreign Application Priority Data

Jul. 31, 1980 [DE] Fed. Rep. of Germany ....... 3029048

[51] Int. Cl.³ .................... G01L 1/02; G01B 7/16
[52] U.S. Cl. .................... 73/862.55; 73/768; 73/862.53; 73/862.58
[58] Field of Search .................... 33/182; 73/760, 768, 73/770, 820, 824, 862.53, 862.55, 862.58

[56] References Cited

U.S. PATENT DOCUMENTS 1,425,506  8/1922  Boulassier ........................ 73/862.58

FOREIGN PATENT DOCUMENTS 2300946  7/1974  Fed. Rep. of Germany .
369437  4/1973  U.S.S.R. ................................ 73/768
427243  12/1974  U.S.S.R. ........................... 73/862.58

*Primary Examiner*—Charles A. Ruehl
*Attorney, Agent, or Firm*—Frishauf, Holtz, Goodman & Woodward

[57] ABSTRACT

To permit adjustment of the engagement pressure of mutually engaged roller elements, such as bearer rings (1, 3) or rubber blanket cylinders (31-34) against an impression cylinder or plate cylinders (35-38), a blind bore (4) is formed in the respective roller elements in a zone where engagement pressure will result in deformation in a wall of the blind bore, the bore being filled with a fluid such as hydraulic fluid, silicone, or the like, the pressure of which is determined by a pressure transducer such as a piezoelectric element coupled, through an amplifier, to a peak detector which indicates pressure upon axial alignment of the blind bore (4) and the axes of rotation of the respective engaging rollers. A base pressure in the chamber can be adjusted by an outside adjustment screw which, like the transducer, is preferably carried on an external adapter element attached to the respective roller.

17 Claims, 4 Drawing Figures

ENGAGEMENT PRESSURE MEASURING APPARATUS FOR ROLLERS IN PRINTING MACHINES

The present invention relates to printing machinery, and more particularly to measuring of the engagement pressure between two rolling elements, for example the engagement pressure of bearer rings in mutual engagement with respect to each other which are coupled to associated cylinders of a rotary printing machine.

BACKGROUND

It has previously been proposed to adjust the engagement pressure of two printing cylinders by sensing the engagement pressure between the bearer rings by mechanical measuring means. For example, the engagement pressure of the working cylinders of a rotary printing machine can be measured by sensing the gap between adjacent bearer rings, which causes elastic deformation thereof, by placing special measuring rollers in the gap between the bearer rings. The flattening of the bearer rings, due to elastic deformation, is in the order of from between about 0.1 to 0.3 mm (see, for example, German Published Patent Application DE-AS No. 23 00 946). Mechanically measuring the deformation has the disadvantage that manufacturing tolerances of the mechanical measuring elements, as well as out-of-round deviations of the bearer rings, for example due to wear thereof, can falsify the measuring results.

THE INVENTION

It is an object to provide a device to determine the engagement pressure of two engaging rolling elements in a printing machine which permits measurement simply and accurately.

Briefly, one of the rolling elements is formed with a chamber therein and located in the radical zone subject to compressive elastic deformation upon exertion of the engagement pressure by another roller; the rolling element may, for example, be the bearer ring coupled to a cylinder, or a rubber blanket cylinder itself. The chamber is entirely filled with a liquid, free from air bubbles, and a pressure transducer is placed in the chamber, the pressure transducer providing an electrical signal capable of identifying the pressure upon subjecting the respective roller element in which the chamber is formed to the engagement pressure. Preferably, the chamber is closed off by a screw element or the like, so that a certain bias pressure can be established within the chamber. Suitable liquids are various types of industrial oils, such as brake fluid or the like, a silicone oil, or semi-viscous materials.

The system permits exact measuring of the engagement forces on the rolling element, typically the bearer ring itself, without requiring any set-up time, and yet yielding precise results. Rubber blankets and printing plates need not be removed from the cylinders and, additionally, the bearer rings need not be cleaned, since outer surface dirt and other accumulation do not falsify the measured result. Geometrical changes on the bearer rings themselves do not influence the measuring results. The measuring point on the bearer ring itself permits measuring the engagement pressure even on bearer rings and in rollers of the printing machine which have impaired accessibility. The bearer rings or the roller elements, such as cylinders, are not damaged upon measuring of engagement pressure. The engagement pressure is not measured as a direct deformation which, due to the unavoidable manufacturing tolerances, always is somewhat inaccurate; rather, the output derived from the measuring apparatus permits accurate determination of actual engagement pressures between the respective rolling elements, for example the bearer rings.

DRAWINGS

Figure 1:
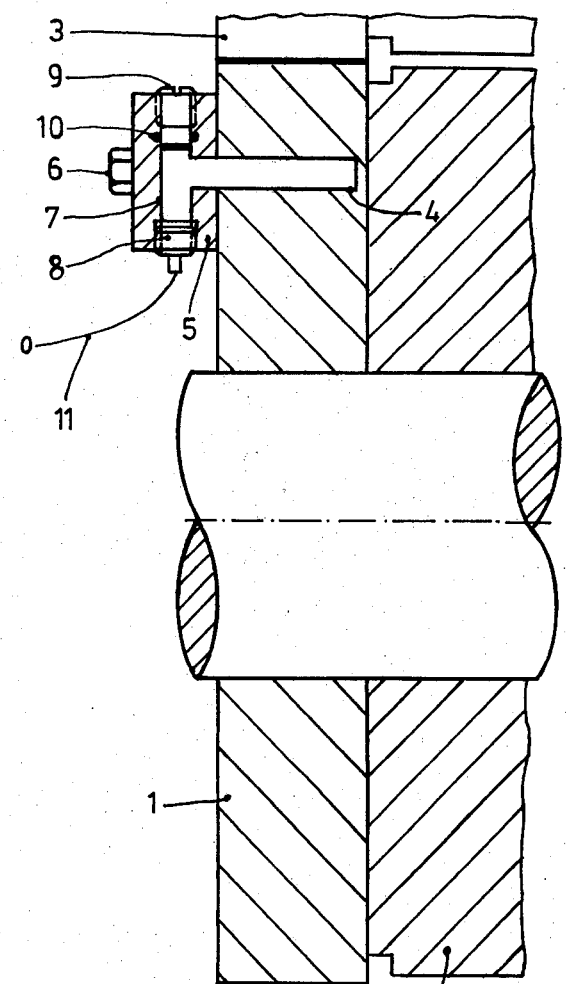
FIG. 1 is a fragmentary axial section through a bearer ring and illustrating the measuring apparatus.

Referring now to FIG. 1: The measuring point is located on a bearer ring 1 which is positioned on a stub shaft of a cylinder 2, not further shown. The cylinder 2 may, for example, be the rubber cylinder of a rotary offset printing machine. The bearer ring 1 is in rolling engagement with a second rolling element shown as a bearer ring 3, coupled to a cylinder which is axially parallel to cylinder 2, and not further shown. It may, for example, be the plate cylinder of the offset printing machine.

The engagement pressure, that is, the bias pressure to which the bearer rings 1, 3 are subjected, is measured by providing a chamber 4, in the form of a blind bore in the bearer ring 1. Chamber 4 extends parallel to the axis of rotation of the shaft over which the bearer ring operates. The distance of the chamber 4 to the outer circumference of the bearer ring 1 must be so selected that the elastic deformation of the surface of the bearer ring 1, due to the engagement pressure with bearer ring 3, will be transferred to the bore 4. The bore or chamber 4 is filled with a liquid, and the deformation of the outer circumference of the bearer ring 1 should be transferrable to the walls of the bore 4. A bearer ring which has an axial width of between about 4 to 5 cm suitably has a blind bore of a diameter of about 1 cm positioned about 2 cm from the outer surface of the bearer ring. The inner or bottom wall of the blind bore 4 should, for the dimensions given, be at least 0.2 cm. The blind bore, extending parallel to the axis and almost entirely through the bearer ring, has the further advantage that, even if the bearer running surface is not entirely parallel to the axis of rotation, but rather is somewhat conical—or undulating and deformed—conical surfaces or non-parallel relationships of the outer circumference of the bearer ring running surface and the axis of rotation do not falsify the measured engagement pressure. The position of the chamber or bore 4 preferably is so selected that, on the one hand, the chamber 4 is still in the region of material deformation which arises due to the engagement pressure while, on the other hand, the geometry of the running surface of the bearer ring is not essentially changed by the presence of the bore 4.

For filling the bore 4 with liquid, and taking off a measuring signal, an adapter 5 is attached to the bearer ring. Adapter 5 is secured, for example, by screws 6 to the outer surface of the bearer ring. It is formed with a chamber 7 which, upon fitting the adapter 5 to the bearer ring 1, is in alignment with the chamber 4 to form therewith a common hollow space or common liquid chamber.

A pressure transducer 8, for example and preferably in form of a piezoelectric crystal, is located in the lower region of the chamber 7 of the adapter 5. THe upper region of chamber 7 is formed as a fill opening, which can be closed off by a screw 9. Screw 9 closes off the single opening forming both a fill and vent opening, and screw 9 additionally serves as a pressure adjustment screw.

Operation: After association the adapter to the bearer ring by attachment with screw 6, a liquid is introduced into the chamber through the screw hole left open by the screw 9 to fill the chamber. The chamber should be filled completely with liquid and be free from bubbles. Hydraulic fluid, paraffin oil, or the like may be used, or any liquid which operates equivalent. Other deformable materials for example greases, silicones, or similar non-compressible materials, are suitable. The adapter is closed off after filling by inserting screw 9. Screw 9 is surrounded by a tight, hard seal 10. After suitable introduction of screw 9 into the opening, it is completely sealed and closed off.

To increase the sensitivity of measurement of the apparatus, the material within the chamber 4, which may generally be characterized as a flowable material, is subjected to a static bias or initial pressure. This static pressure, preferably, is in the order of between 5 to 20 bar, and can be commanded to achieve a desired value by suitable screwing-down of screw 9.

The force applied between the bearer rings 1, 3 causes a deformation of material in the outer region of the bearer ring 1, that is, the region or zone within which the chamber 4 is positioned. After filling the chamber 4 as aforesaid, the printing cylinder is brought into the position shown, for example, in FIG. 1, in which the chamber 4 is directly beneath the bearer ring 3. At this position, the deformation of the bearer ring 1 will cause a change of compression exerted in the liquid of the chamber 4—a change which is sensed by the transducer element 8. The transducer 8 reacts to this change by generating an electrical signal which is applied over a line 11 to an evaluation and indicating or output circuit as shown in FIG. 3.

Figure 2:
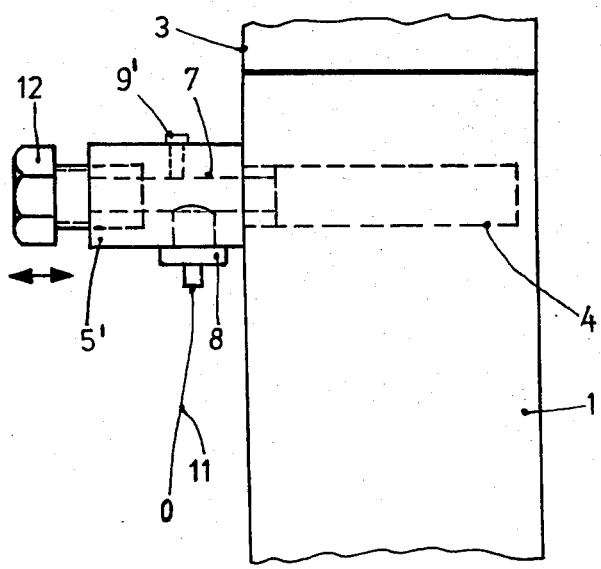
FIG. 2 is a fragmentary part-side view, part-phantom illustration of another embodiment of the measuring apparatus.

The apparatus illustrated in FIG. 2 is, basically, the same as that shown in FIG. 1; additionally, however, the adapter 5' of FIG. 2 includes a separate pressure adjustment screw 12 which is used to adjust the static pressure of the flowable liquid in chamber 4 to the desired value. The closing screw 9', in this embodiment, serves only to close off a fill and vent opening.

Figure 3:
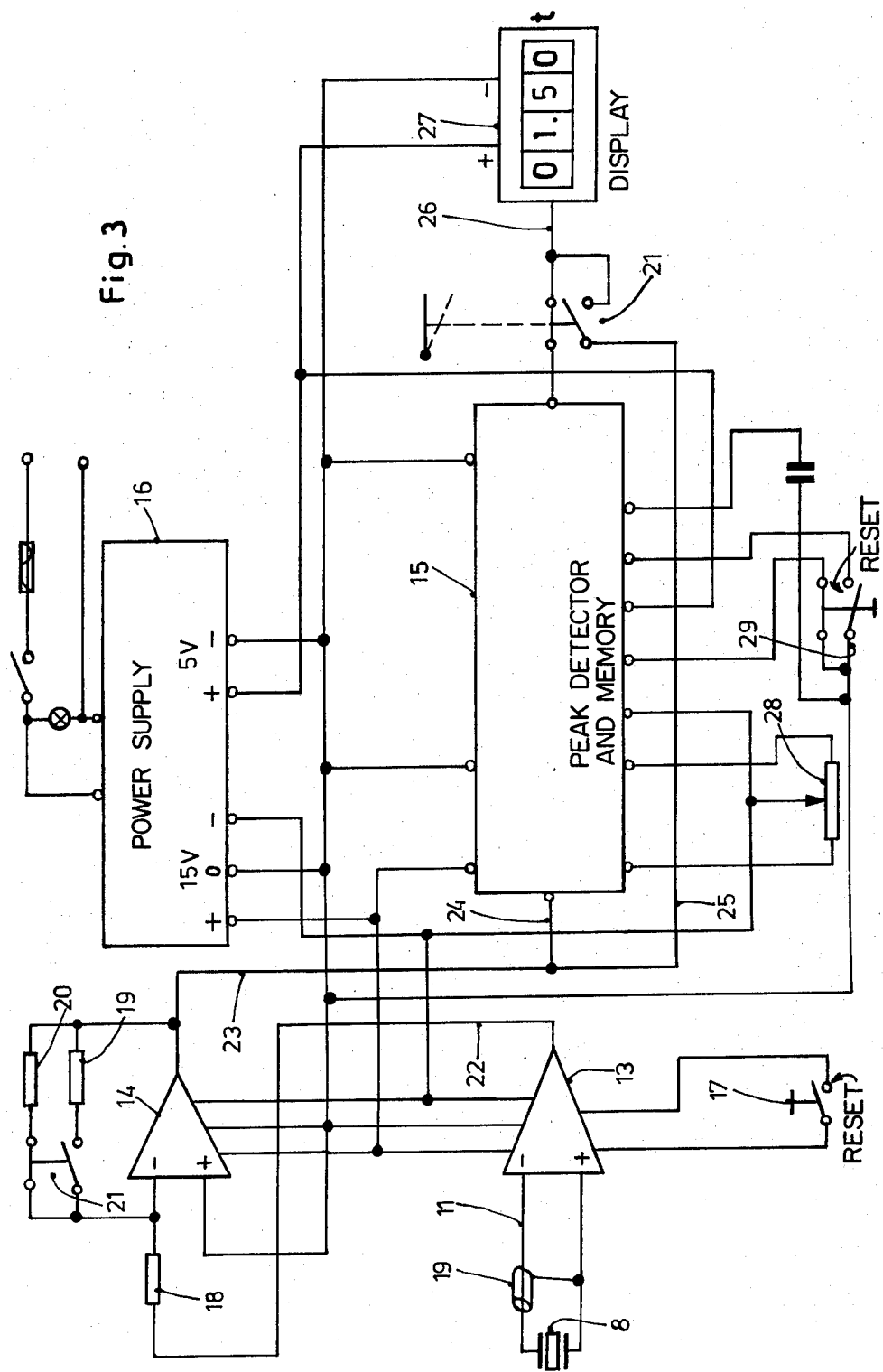
FIG. 3 is a block circuit diagram of the electrical evaluations circuitry suitable to provide direct read-out.

Evaluation circitry, with reference to FIG. 3: The output line 11 from the transducer element 8 preferably is a coaxial cable 19. The information supplied through line 11 is in form of an electrical charge generated by the transducer 8, and is amplified in an amplifier 13, preferably including a field effect transistor (FET) charge amplifier. The amplifier 13 provides an output voltage from its output to the inverting input of an operational amplifier 14 from where it is applied to a peak detector and memory circuit 15 for display in a display 27.

Power supply is derived from a source 16 connected, as customary, through a fuse and main switch and indicator lamp to a power supply network, and providing bipolar +/−15 V outputs as well as direct 5 V output. The FET charge amplifier 13 has a reset switch 17 connected thereto, as well known, for 0-calibration.

The operational amplifier 14 receives the input signal from amplifier 13 through a coupling resistor 18. The feedback factor of operational amplifier 14 can be changed by selectively connecting resistors 19, 20. The selection of the feedback resistance is effected by switch 21. Line 22 connects from the output of the FET charge amplifier 13 to the operational amplifier 14. The output connection 23 from the operational amplifier 14 carries a signal which identifies a predetermined pressure which is applied over a line 24 to the peak detector in memory 15 and over a line 25 to a further terminal of switch 21 and then directly to the input 26 of a display element 27. Suitably, the display element 27 is a digital volt meter which can be calibrated in tons of engagement pressure.

The peak detector also requires calibration. A resistor 28 in the form of a potentiometer is provided, as well as a reset switch 29 which permits resetting the peak detector 15 to null or zero.

Measuring engagement pressure, and calibration: Before initiating the actual measuring procedure, the chamber 4 is filled with a suitable substance and the static pressure is then set. The two lower contacts of the contact pairs of switch 21 associated with the operational amplifier 14 are so connected that the lower resistor 19 is connected in parallel with the operational amplifier, and resistor 20 is out of circuit. Resistor 19 is so dimensioned that the amplification factor of amplifier 14 is reduced. The contact 21 is closed, to the position shown, so that the output from operational amplifier 14 is directly applied to the digital volt meter 27, effectively bypassing the peak detector and memory 15, the through-connection of which is open by the upper terminal of the multi-unit switch 21 and connected between the peak detector 15 and the display 27. Consequently, display 27 will display the static pressure on the digital volt meter 27 by displaying the output from amplifier 14. This static pressure can be changed by adjustment of the closure screw 9 (FIG. 1) or of the pressure screw 12 (FIG. 2), to a predetermined base value.

After adjustment of the static pressure to a value of between, preferably, about 5 and 20 bar, switch 21 is changed over the "measuring" state, so that the switch terminal will be in the position shown in the drawing. In order to clear the system, the reset switches 17, 29 are operated. The push button 17 eliminates signals representative of static pressure in the charge amplifier 13, so that actual subsequent engagement pressure can be indicated. The reset switch 29 must be operated in advance of each measuring cycle in order to reset the peak detector in memory 15 to zero or null.

In the position shown, the resistor 20 is now in parallel with the operational amplifier 14, so that it can operate with increased amplification factor. The output of the peak detector 15 is connected to the input 26 of the display unit 27. The bearer rings are now permitted to rotate. As the bearer ring 3 and bearer ring 1 come into a position at which the bore 4 is in axial alignment between the axes of rotation of the bearer rings 1 and 3, pressure changes will result within the chamber 4 which are recorded by the transducer 8. These pressure changes are transmitted over the connecting line 11, the FET charge amplifier 13 and operational amplifier 14 to the peak detector and memory 15. The peak detector 15 will detect the maximum application pressure and store this pressure in form of a stored voltage which corresponds to the maximum engagement pressure between the bearer rings 1, 3, by decoding the voltage supplied by the transducer. This maximum voltage will be indicated on a display 27 for the time of the memory timing of the peak detector 15. This indicated pressure can then be used for adjustment of the respective engagement pressures, for example by then changing the engagement pressures until the indicated pressure on the display 27 is identical to the desired value. The display 27 can be calibrated for direct indication representative of actual engagement pressures; a final engagement pressure of, for example, 2 tons may be desirable. The actual pressure change within the chamber 4 upon such engagement pressure may be, for example, 1.5 bar, which would occur with apparatus of the dimensions previously given.

Figure 4:
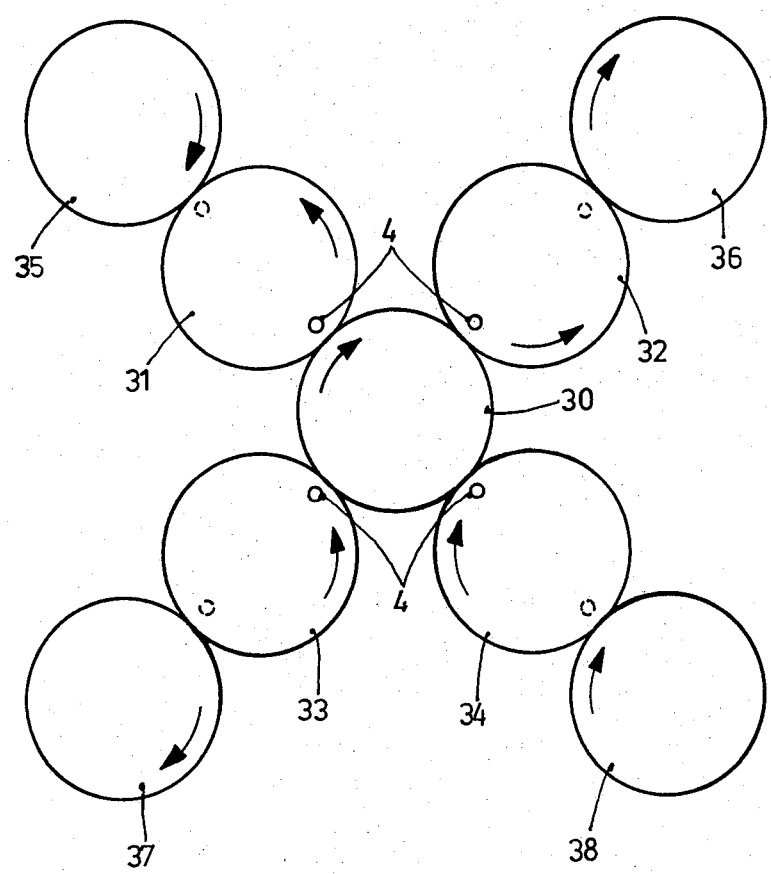
FIG. 4 is a schematic diagram of a printing machine, showing suitable locations for application of the measuring apparatus.

Embodiment of FIG. 4: A rotary offset printing machine system is shown in highly schematic manner, having a single impression cylinder 30 and four rubber blanket cylinders 31–34 positioned thereabout, each one of which is in engagement with a respective plate cylinder 35–38. Each one of the blanket cylinders 31–34 has a chamber 4 located therein, as schematically indicated by the full-line circle within the cylinders 31, 32, 33, 34. In the position shown, the respective engagement pressures between the impression cylinder 30 and the rubber cylinders 31–34 can be measured. Upon rotating the cylinders 31–34 by 180°, the chambers 4 will reach the position shown in broken lines in FIG. 4 so that, in the then indicated position, the engagement pressure between the respective plate cylinders 35–38 and the respective blanket cylinders 31–34 can be determined.

Various changes and modifications may be made, and features described in connection with any one of the embodiments may be used with any of the others, within the scope of the inventive concept.

A suitable peak detector and memory unit 15 is Hybrid-Micro-Circuit Peak Detector of Burr-Brown.

We claim:

1. In a rotary printing machine,
apparatus to measure the engagement pressure of two rollers rolling off against each other comprising, in accordance with the invention,
a chamber (4) formed in one of the rollers (1; 31–34) and located in a rolling zone subject to compressive deformation upon exertion of said engagement pressure by the engaging other roller (3; 30, 35–38);
a flowable substance entirely filling the chamber in said one roller;
a pressure transducer (8) positioned in pressure transfer relationship to the flowable substance;
and output means coupled to the pressure transducer and furnishing data representative of said engagement pressure upon deformation of said one roller in said zone and consequent deformation of a surface area of said one roller adjacent said chamber.

2. Apparatus according to claim 1, wherein the rollers are bearer rings (1, 3) associated with cylinders of the printing machine.

3. Apparatus according to claim 1, wherein the roller formed with a chamber comprises a rubber blanket cylinder (31–34).

4. Apparatus according to claim 1, wherein said transducer (8) comprises a piezoelectric transducer.

5. Apparatus according to claim 1, wherein the output means comprises amplifier means (13, 14), a peak detector (15) and an output element (27) connected to receive the peak value derived from the peak detector and indicating peak engagement pressure.

6. Apparatus according to claim 5, wherein the amplifier means comprises a field effect transistor charge amplifier and an operational amplifier (14).

7. Apparatus according to claim 5, wherein the output element comprises a digital volt meter.

8. Apparatus according to claim 5, including means (5, 9, 12) coupled to the chamber to provide for presetting static pressure of the flowable substance therein.

9. Apparatus according to claim 8, further including switch means bypassing the peak detector (15) to permit presetting of said output element for adjustment of the static pressure.

10. Apparatus according to claim 9, wherein the amplifier means comprises an adjustable gain amplifier.

11. Apparatus according to claim 1, further including an adapter element (5) having a chamber (7) therein, and attached to said one roller, with the chamber (7) in the adapter element and the chamber (4) in said one roller being in alignment;
the pressure transducer being positioned on the adapter element and in fluid pressure transfer communication with the chamber (7) therein;
a filling and sealing opening communicating with the chamber (7) of the adapter element;
and a sealing screw (9) in said opening capable of sealing the chamber (7) in the adapter element and adjusting the pressure of flowable substance placed in both said chambers.

12. Apparatus according to claim 11, further including a separate pressure adjustment screw (12) adjustably extending in communication with the chamber (7) of the adapter element.

13. Apparatus according to claim 11, wherein the flowable substance in the chamber (7) of said adapter element (5) comprises,
at least one of the materials selected from the group consisting of: hydraulic fluid; paraffin oil; silicone; flowable grease;
and wherein said screw (9) is adjusted to set a bias pressure of said material in the chamber (7) of the adapter element (5) in the order of between 5 and 20 bar.

14. Apparatus according to claim 1, wherein the chamber (4) in said roller is a blind bore extending parallel to the axis of rotation of the roller.

15. Apparatus according to claim 14, wherein the distance of the blind bore from the outer circumference of the roller is in the order of about 2 cm.

16. Apparatus according to claim 14 or 15, wherein the blind bore has a diameter of about 1 cm.

17. Apparatus according to claim 1, wherein said flowable substance comprises at least one of the materials selected from the group consisting of: hydraulic fluid; paraffin oil; silicone; flowable grease.

* * * * *